United States Patent
Grasso et al.

(10) Patent No.: US 10,780,863 B2
(45) Date of Patent: Sep. 22, 2020

(54) CAP, CONNECTING DEVICE FOR MOUNTING A WINDSCREEN WIPER ON A CORRESPONDING WINDSCREEN WIPER ARM AND WINDSCREEN WIPING SYSTEM

(71) Applicant: Valeo Systèmes d'Essuyage, Le Mesnil Saint Denis (FR)

(72) Inventors: Giuseppe Grasso, Issoire (FR); Guillaume Barret, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 106 days.

(21) Appl. No.: 15/919,598

(22) Filed: Mar. 13, 2018

(65) Prior Publication Data
US 2018/0265046 A1    Sep. 20, 2018

(30) Foreign Application Priority Data
Mar. 14, 2017   (FR) ...................... 17 52075

(51) Int. Cl.
*B60S 1/40*       (2006.01)

(52) U.S. Cl.
CPC ............. *B60S 1/4077* (2013.01); *B60S 1/407* (2013.01); *B60S 1/40* (2013.01); *B60S 1/4019* (2013.01)

(58) Field of Classification Search
CPC ........ B60S 1/4019; B60S 1/3853; B60S 1/40; B60S 1/4016
See application file for complete search history.

(56) References Cited

U.S. PATENT DOCUMENTS

| 8,650,701 B2 * | 2/2014 | Yang ..................... B60S 1/3867 |
| | | 15/250.32 |
| 9,168,897 B2 * | 10/2015 | Erdal .................... B60S 1/3853 |
| 9,387,830 B2 * | 7/2016 | Depondt ................ B60S 1/387 |

(Continued)

FOREIGN PATENT DOCUMENTS

| DE | 10259480 A1 | 1/2004 |
| EP | 3045357 A1 | 7/2016 |

OTHER PUBLICATIONS

Preliminary Search Report and Written Opinion issued in corresponding French Application No. 1752075, dated Nov. 21, 2017 (6 pages).

*Primary Examiner* — Michael D Jennings
(74) *Attorney, Agent, or Firm* — Osha Liang LLP

(57) ABSTRACT

The invention relates to a cap (17) which is configured to be assembled with a terminal segment (9) of a windscreen wiper arm (5) which is configured to be connected to a windscreen wiper (3), said terminal segment (19having a longitudinal end (11) bearing a transverse pin (13) which is configured to define a pivot axis of the windscreen wiper (3), the cap (17) comprising:
  an upper part (171) which is configured to cover the terminal segment (9) of the windscreen wiper arm (5) in the assembled state of the cap (17) on said terminal segment (9),
  a lower part (173), and
  at least one fixing means (23) which is configured to cooperate with the transverse pin (13).
According to the invention, the lower part (173) of the cap (17) comprises at least one support means (19) which is produced integrally with the cap (17) and which is configured to cooperate with the terminal segment (9) of the windscreen wiper arm (5) for the assembly of the cap (17) with the terminal segment (9).

16 Claims, 5 Drawing Sheets

(56) References Cited

U.S. PATENT DOCUMENTS

| | | | | |
|---|---|---|---|---|
| 9,545,898 B2 * | 1/2017 | Caillot | | B60S 1/3868 |
| 9,555,775 B2 * | 1/2017 | Fournier | | B60S 1/4003 |
| 2011/0247166 A1 * | 10/2011 | Depondt | | B60S 1/387 |
| | | | | 15/250.32 |
| 2014/0196240 A1 * | 7/2014 | Grasso | | B60S 1/524 |
| | | | | 15/250.04 |
| 2014/0259505 A1 * | 9/2014 | Fournier | | B60S 1/4003 |
| | | | | 15/250.32 |
| 2015/0089765 A1 * | 4/2015 | Song | | B60S 1/3853 |
| | | | | 15/250.32 |
| 2016/0375872 A1 * | 12/2016 | Mouleyre | | B60S 1/4038 |
| | | | | 15/250.32 |
| 2017/0203732 A1 * | 7/2017 | Jomard | | B60S 1/3805 |

* cited by examiner

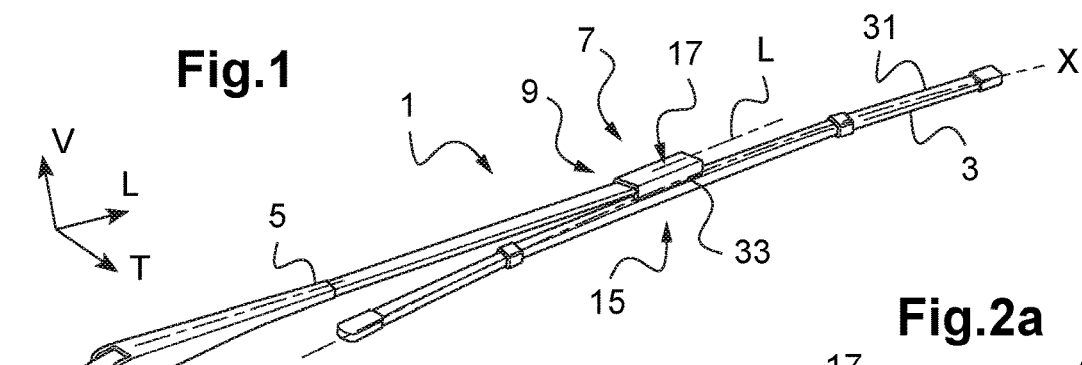
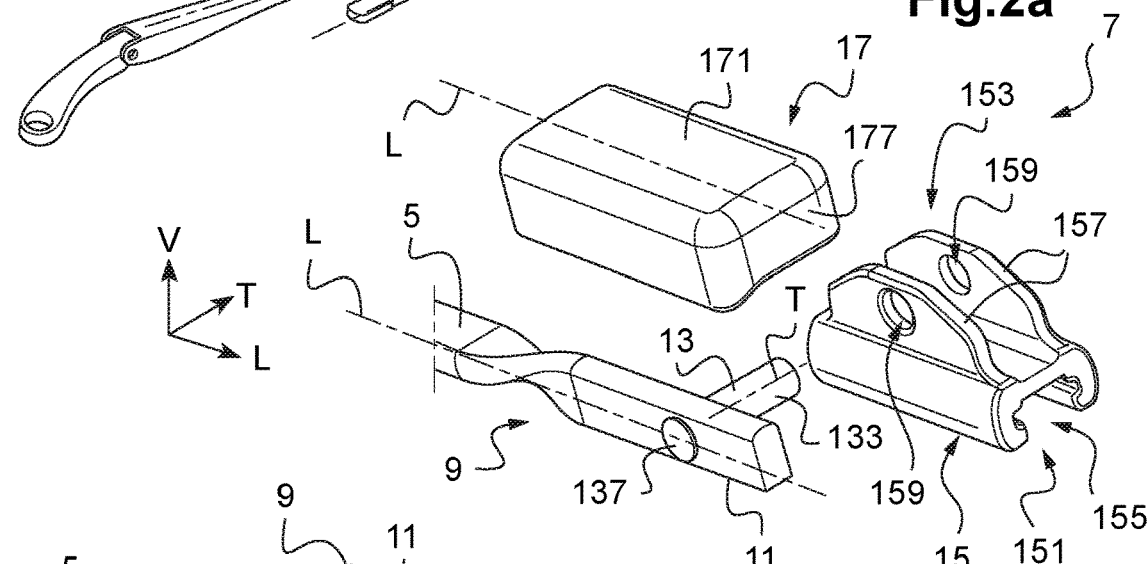
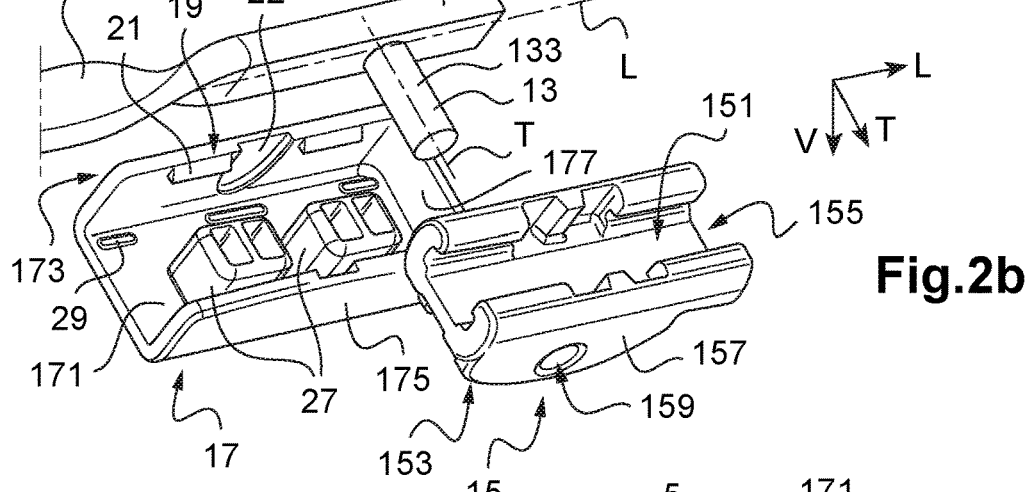
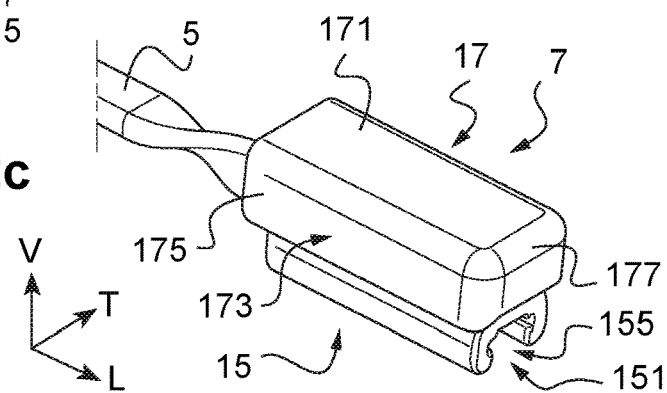

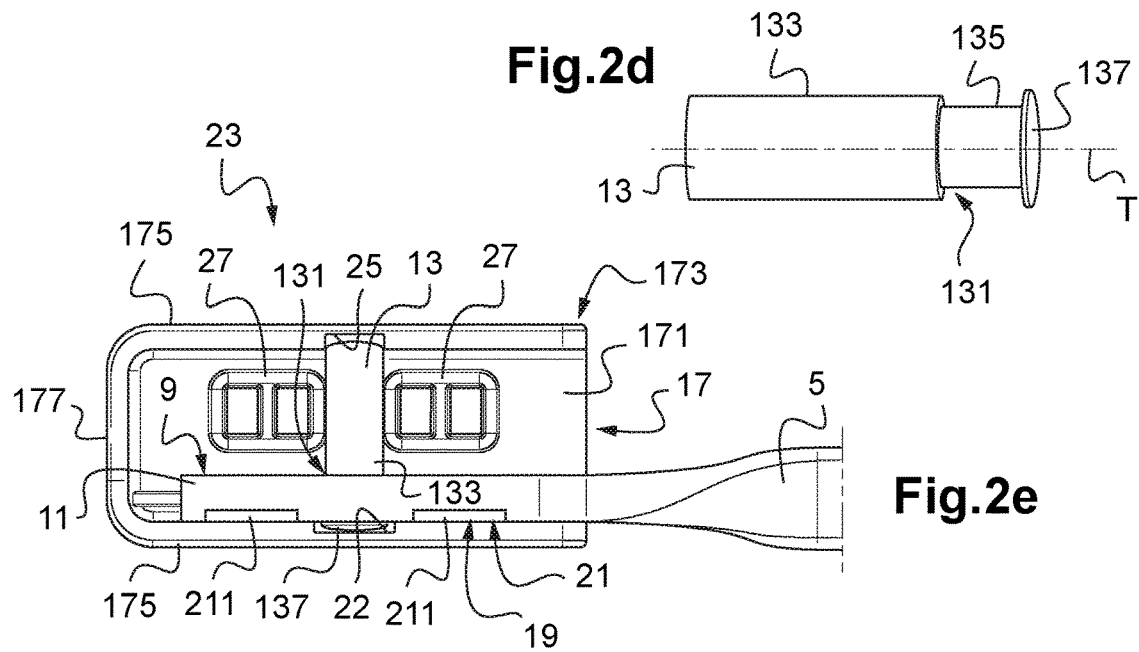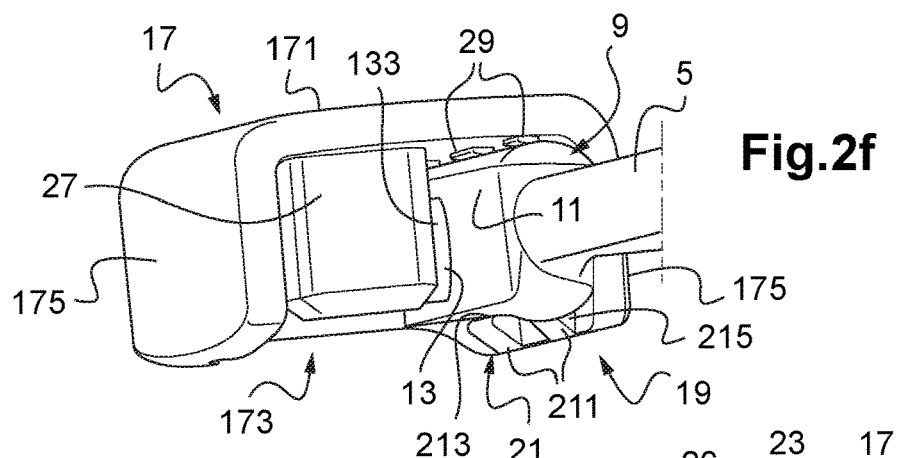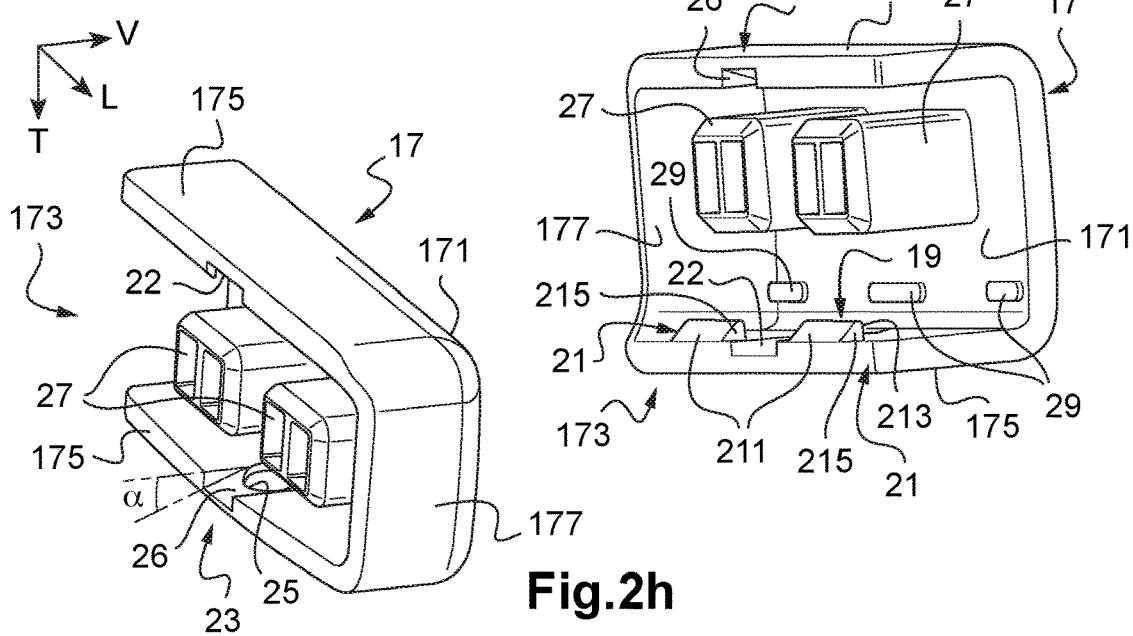

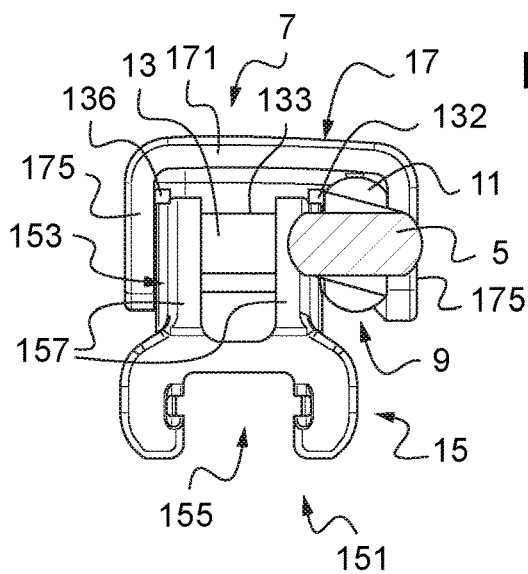
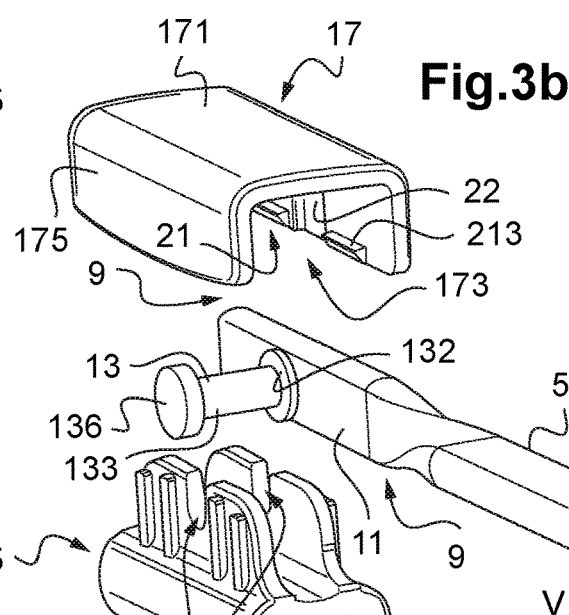
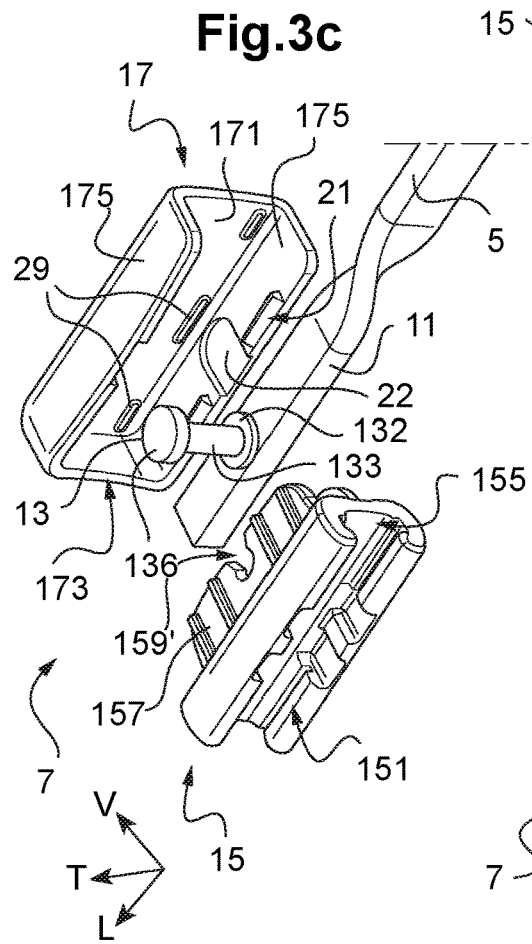
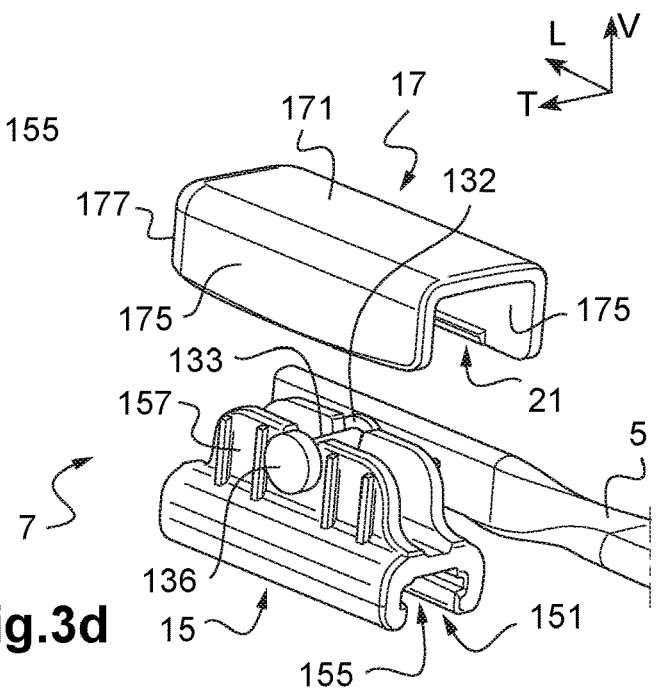

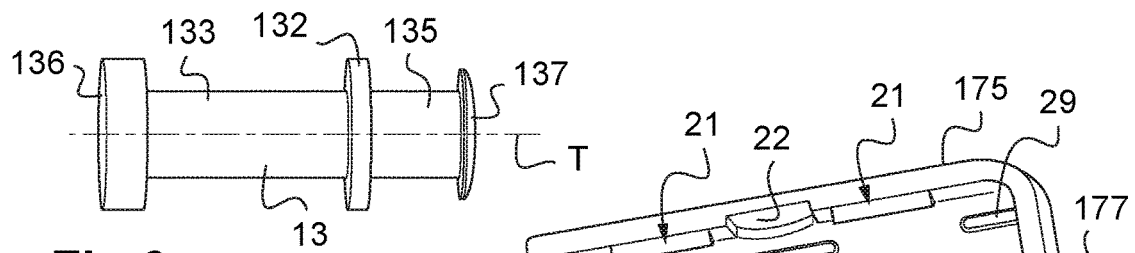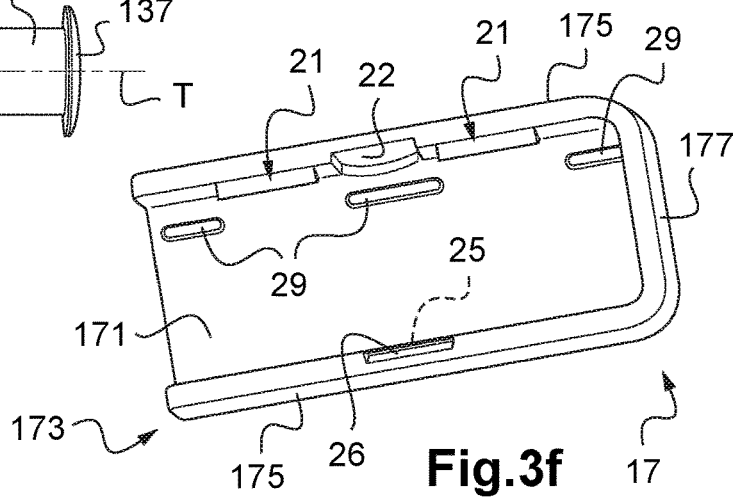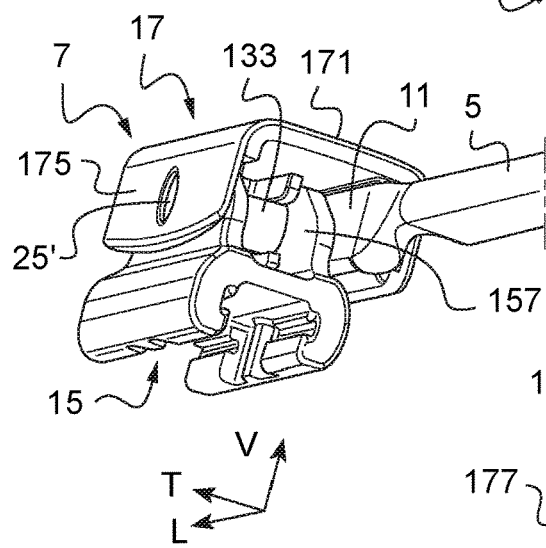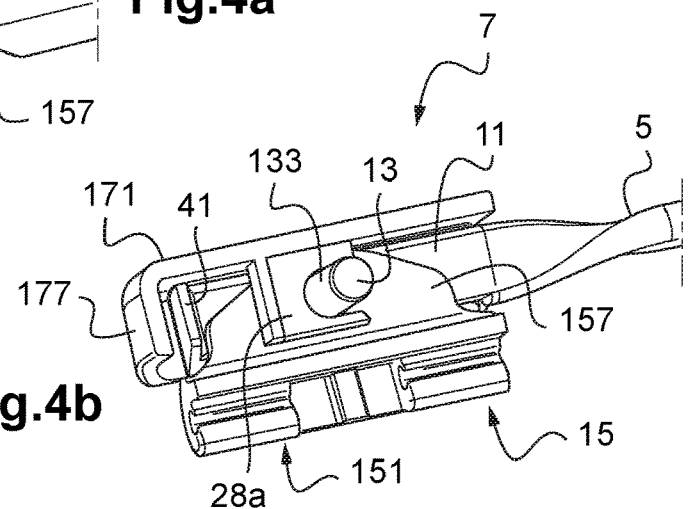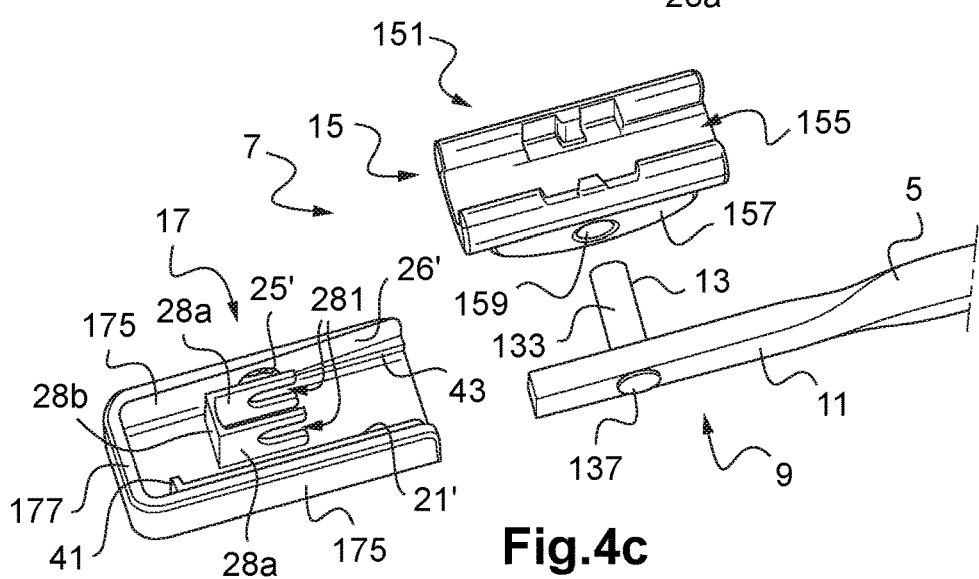

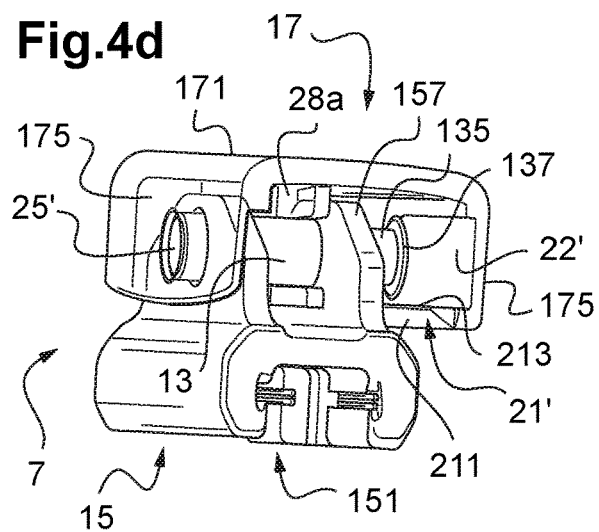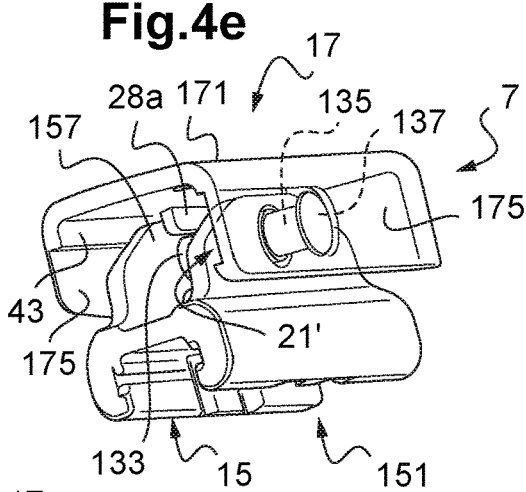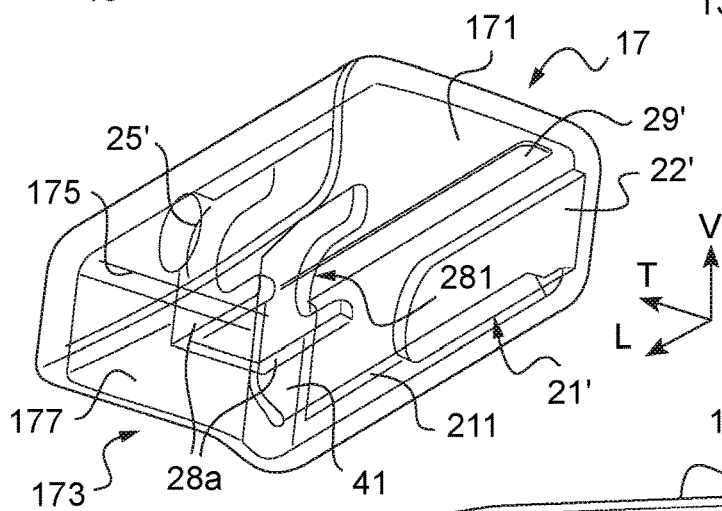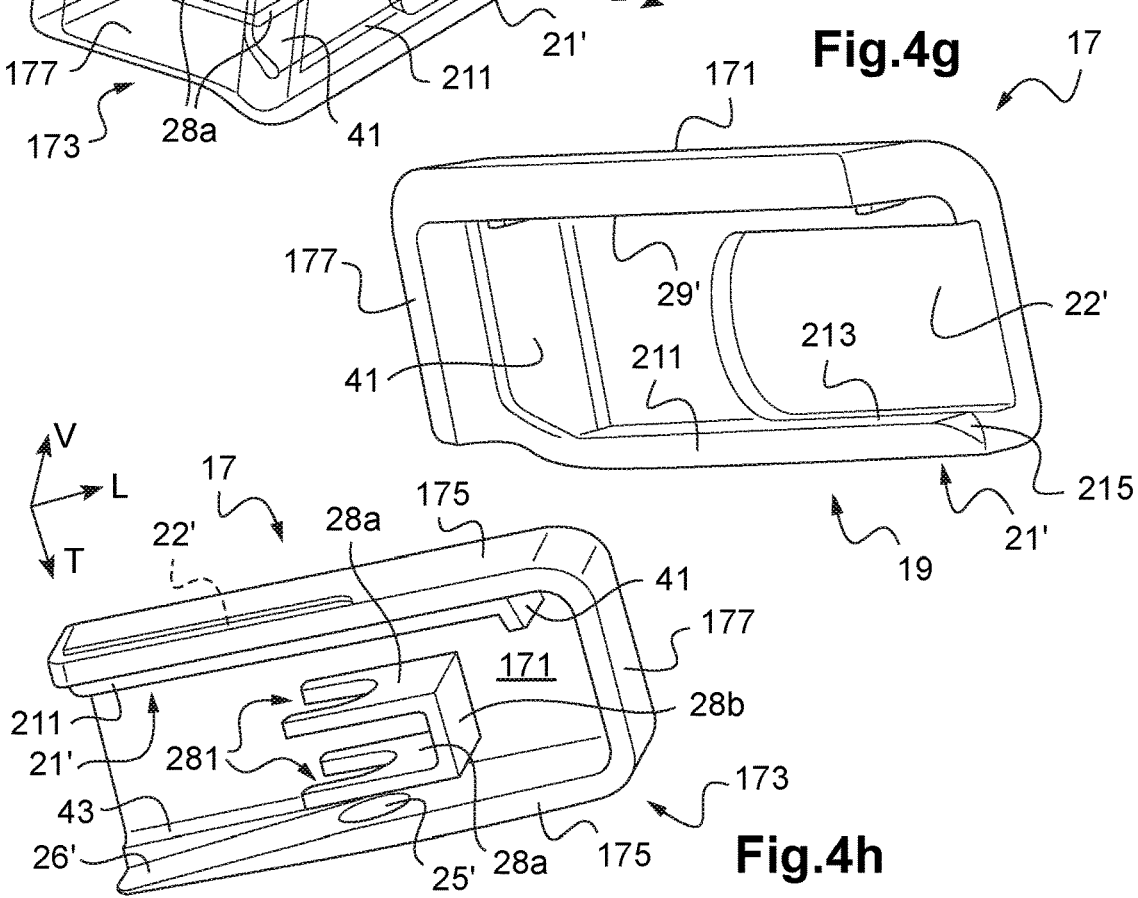

CAP, CONNECTING DEVICE FOR MOUNTING A WINDSCREEN WIPER ON A CORRESPONDING WINDSCREEN WIPER ARM AND WINDSCREEN WIPING SYSTEM

The present invention relates to the fixing of a windscreen wiper to a windscreen wiper arm, in particular of a motor vehicle. The invention relates more particularly to a cap covering the connection between the arm and the windscreen wiper. The present invention further relates to a connecting device for assembling the windscreen wiper to the windscreen wiper arm of a motor vehicle, comprising such a cap. The invention further relates to a corresponding windscreen wiping system.

In the usual manner, a motor vehicle is provided with windscreen wipers to provide cleaning of a glazed surface such as the windscreen. These windscreen wipers generally comprise windscreen wiper arms, performing a reciprocal angular movement, and wipers which in turn bear the wiper blades. These blades scrape against the glazed surface in order to remove cleaning fluid by driving it away from the field of vision of the driver.

According to these known solutions, the wiper is attached to the windscreen wiper arm by a connecting device.

The invention relates more particularly to a connecting device for a windscreen wiper arm of the so-called lateral pivot type or lateral pivot pin type, also known by the term "side lock". Such a windscreen wiper arm comprises a terminal segment which is configured to cooperate with the connector. This terminal segment comprises a first elongated element or longitudinal end extending substantially into the extension of the windscreen wiper arm. Moreover, a substantially cylindrical rod extends perpendicularly from the longitudinal end of the windscreen wiper arm and forms a transverse pin.

The connecting device comprises a connector and a cap. The connector is a part which is designed to be fixed to the windscreen wiper. The connector is also designed to be traversed by the transverse pin borne by the windscreen wiper arm in order to connect the connector to the terminal segment of the windscreen wiper arm by a pivot connection about the transverse pin. In the assembled state, the windscreen wiper is able to pivot about the transverse pin in order to adapt to the glazed surface during the reciprocal motion of the windscreen wiper.

The cap in turn is designed to be assembled and locked to the connector.

As a result, the connecting device comprises means enabling the connection and locking of the cap to the connector which is mounted on the windscreen wiper.

However, according to the known solutions, the assembly and the locking of the assembly require complicated procedures. For example, the cap may be mounted on the connector and rotational movements are required between the cap and the connector before it is possible to lock the assembly.

One of the objects of the present invention is to remedy at least partially these problems of the prior art by proposing an alternative at reduced cost, facilitating the mounting and dismantling of the cap on the connector which is designed to be connected to the windscreen wiper, on the one hand, and to the windscreen wiper arm, on the other hand, by means of the transverse pin.

To this end, the subject of the invention is a cap which is configured to be assembled on a terminal segment of a windscreen wiper arm which is configured to be connected to a windscreen wiper, said terminal segment having a longitudinal end bearing a transverse pin which is configured to define a pivot axis of the windscreen wiper, the cap comprising:
- an upper part which is configured to cover the terminal segment of the windscreen wiper arm in the assembled state of the cap on said terminal segment,
- a lower part opposing the upper part, and
- at least one fixing means which is configured to cooperate with the transverse pin, so as to fix the transverse pin to the cap.

According to the invention, the lower part of the cap comprises at least one support means which is produced integrally with the cap and which is configured to cooperate with the terminal segment of the windscreen wiper arm for the assembly of the cap on the terminal segment of the windscreen wiper arm.

Such a cap is simple to produce. In particular, one tooling operation suffices to produce the support means which are made of the same material as the cap.

According to one or more features of the cap, taken individually or in combination:
- said at least one support means comprises at least one relief formed on the lower part of the cap;
- said at least one relief is made from the same material as the cap;
- the cap comprises two opposing lateral walls extending from the upper part of the cap;
- said at least one relief is formed on a lower portion of at least one lateral wall;
- at least the lateral wall of the cap bearing said at least one relief is at least partially flexible and is configured to be deformed so as to permit the locking or the unlocking of the cap and of the terminal segment of the windscreen wiper arm;
- said at least one support means comprises at least one clipping element. This clipping element permits a simple connection of the cap to the connector which is designed to bear the transverse pin without requiring complicated procedures. It suffices to mount the cap on the connector or to slide the cap around the connector, and the cap is designed to be clipped or fixed by clipping in a simple manner to the windscreen wiper arm, the transverse pin thereof being mounted in the connector;
- said at least one support means comprises at least one clipping relief which is configured to block the retraction of the terminal segment of the windscreen wiper arm in the assembled state of said terminal segment on the cap;
- said at least one support means comprises at least one guide relief which is configured to guide the terminal segment of the windscreen wiper arm during the assembly of the terminal segment of the windscreen wiper arm on the cap;
- said at least one clipping relief is configured to guide the windscreen wiper arm;
- the cap has a longitudinal shape;
- said at least one relief extends in the longitudinal direction of the cap;
- the cap comprises a similar relief extending over more than half of the length of the cap;
- the cap comprises a partition forming an abutment for the terminal segment of the windscreen wiper arm;
- the cap comprises at least two separate reliefs;
- said at least one relief comprises an oblique face relative to the lower part of the cap;

the oblique face is configured to be in contact with the terminal segment of the windscreen wiper arm during the assembly of said terminal segment with the cap;

said at least one relief comprises a stop face forming an edge, the terminal segment of the windscreen wiper arm being configured to bear thereagainst in the assembled state of the terminal segment on the cap;

said at least one fixing means comprises at least one orifice formed on the cap;

the orifice is configured to block the transverse pin borne by the windscreen wiper arm in the assembled state of the cap on said terminal segment;

the orifice is blind;

the orifice is a through-orifice;

the orifice is arranged on the side opposing said at least one support means;

said at least one fixing means comprises at least two protuberances formed on the upper part of the cap;

the transverse pin is configured to be engaged between the two protuberances during the assembly with the cap, for the centring of the terminal segment of the windscreen wiper arm;

the protuberances have respectively a "figure of 8" shape or the like;

said at least one fixing means comprises at least one fixing wall (28a), or even at least two fixing walls, extending from the upper part of the cap to the interior of the cap, and respectively having a notch, the transverse pin borne by the windscreen wiper arm being configured to be engaged therein;

the notch is U-shaped or of similar shape;

the cap is configured to be assembled on the terminal segment of the windscreen wiper arm by translation in the longitudinal direction of the cap;

the cap is configured to be assembled with the terminal segment of the windscreen wiper arm by translation in a direction perpendicular to the longitudinal direction of the cap.

A further subject of the invention is a connecting device for the mounting of a windscreen wiper on a windscreen wiper arm comprising:

a connector which is configured to be connected to the windscreen wiper, on the one hand, and to the windscreen wiper arm, on the other hand, and a cap, as defined above, which is configured to cooperate with the connector so as to fix the windscreen wiper to the windscreen wiper arm.

A further subject of the invention is a windscreen wiping system for a motor vehicle comprising a connecting device as defined above.

According to one feature of the invention, the windscreen wiping system for a motor vehicle comprises at least one windscreen wiper.

Further features and advantages of the invention will become more apparent from reading the following description, provided by way of illustrative and non-limiting example, and the accompanying figures, in which:

FIG. 1 is a perspective view showing a windscreen wiping system,

FIG. 2a is an exploded plan view of a first embodiment of a connecting device on a terminal segment of a windscreen wiper arm of the windscreen wiping system of FIG. 1, FIG. 2b is an exploded view from below of a connecting device and of the terminal segment of the windscreen wiper arm of FIG. 2a, FIG. 2c is a perspective view of the connecting device of FIGS. 2a and 2b assembled on the terminal segment of the windscreen wiper arm, FIG. 2d shows an example of the transverse pin borne by the terminal segment of a windscreen wiper arm, FIG. 2e is a view from below showing a cap of the connecting device assembled on the terminal segment of the windscreen wiper arm of FIGS. 2a to 2c, FIG. 2f is a side view of FIG. 2e, FIG. 2g is a first perspective view showing the interior of the cap according to the first embodiment, FIG. 2h is a second perspective view showing the interior of the cap according to the first embodiment, FIG. 3a shows a second embodiment of a connecting device on a terminal segment of a windscreen wiper arm of the windscreen wiping system of FIG. 1, FIG. 3b is a first exploded view of the connecting device and of the terminal segment of the windscreen wiper arm of FIG. 3a, FIG. 3c is a second exploded view of the connecting device and of the terminal segment of the windscreen wiper arm of FIG. 3a, FIG. 3d is an exploded view showing the terminal segment of the windscreen wiper arm and a connector of the connecting device according to the second embodiment before assembly with the cap, FIG. 3e shows a transverse pin borne by the terminal segment of the windscreen wiper arm of FIGS. 3a to 3d, FIG. 3f is a perspective view from below of the cap according to the second embodiment, FIG. 4a shows a third embodiment of a connecting device on a terminal segment of a windscreen wiper arm of the windscreen wiping system of FIG. 1, FIG. 4b is a sectional view of FIG. 4a, FIG. 4c is an exploded view of the connecting device and of the terminal segment of the windscreen wiper arm according to the third embodiment, FIG. 4d is a first perspective view showing the connecting device according to the third embodiment assembled with the transverse pin, FIG. 4e is a second perspective view showing the connecting device according to the third embodiment assembled with the transverse pin, FIG. 4f is a perspective view of the cap of the connecting device according to the third embodiment, FIG. 4g is a sectional view of the cap according to the third embodiment, and FIG. 4h is a view from below of the cap according to the third embodiment.

In these figures, elements which are identical or similar are identified by the same reference numerals.

The following embodiments are examples. Whilst the description refers to one or more embodiments, this does not necessarily mean that each reference relates to the same embodiment or that the features apply solely to a single embodiment. Individual features of different embodiments may also be combined together or interchanged to provide further embodiments.

In the description, it is possible to index certain elements, such as for example the first element or second element. Here, it is a case of simple indexing in order to differentiate and denote elements which are similar but not identical. This indexing does not imply a priority of one element relative to another and it is possible in a simple manner to interchange such denominations without departing from the scope of the present invention. Nor does this indexation imply a chronological order.

A windscreen wiping system 1 has been shown in FIG. 1. The windscreen wiping system may also comprise a motorized mechanism of a motor vehicle. The windscreen wiping system 1 comprises:

at least one windscreen wiper 3 designed to be fixed to a windscreen wiper arm 5 and a connecting device 7 designed to permit the assembly of the windscreen wiper 3 to the windscreen wiper arm 5.

The windscreen wiping system 1 may comprise or may not comprise the windscreen wiper arm 5.

The windscreen wiper 3 extends longitudinally in a direction X. The windscreen wiper 3 comprises, in particular, a spoiler 31 and a wiper blade 33. The spoiler 31 and the wiper blade 33 are made of a flexible material.

The windscreen wiper arm 5 extends longitudinally in a direction L. In the remainder of the description and in a non-limiting manner, the longitudinal, vertical and transverse directions indicated in FIG. 1 by the trihedron (L, V, T) will be adopted. In the remainder of the description, the terms upper/lower, above/below, top/bottom are denoted with reference to the arrangement of the elements in the figures in the vertical direction V.

The windscreen wiper arm 5 comprises a terminal segment 9, most clearly visible in FIGS. 2a, 2b, which is configured to be connected to the windscreen wiper 3. More specifically, the terminal segment 9 of the windscreen wiper arm 5 may be connected to the windscreen wiper 3 by means of the connecting device 7.

The terminal segment 9 has a longitudinal end 11. The longitudinal end 11 bears a transverse pin 13 which is configured to define a pivot axis of the windscreen wiper 3 (not visible in FIGS. 2a, 2b). In this case, the windscreen wiper arm 5 has a so-called "side lock". The transverse pin 13 is generally of substantially cylindrical shape. In other words, the transverse pin 13 is generally of cylindrical shape or the like. This transverse pin 13 extends in the transverse direction T, perpendicular to the longitudinal direction L.

The connecting device 7 (see FIGS. 2a to 2c) permits the mounting and the articulation of the windscreen wiper 3, also with reference to FIG. 1, on the windscreen wiper arm 5, more specifically on the longitudinal end 11. To this end, the connecting device 7 comprises a connector 15 and a cap 17.

The connector 15 (FIGS. 2a to 2c) is configured to be connected to the windscreen wiper 3, on the one hand, and to the windscreen wiper arm 5, on the other hand (FIG. 1). The connector serves 15 as an interface with the windscreen wiper 3 and the windscreen wiper arm 5.

The cap 17 is configured to cooperate with the connector 15 so as to fix the windscreen wiper 3 to the windscreen wiper arm 5. The cap 17 permits, in particular, the locking of the assembly.

In the assembled state of the fixing device 7 on the terminal segment 9 of the windscreen wiper arm 5, the transverse pin 13 (visible in FIGS. 2a, 2b) is mounted in the connector 15 and supported by the cap 17. The connector 15 and the cap 17 thus cooperate to support and fix the windscreen wiper 3 on the windscreen wiper arm 5.

A connecting device 7 may comprise different types of connectors 15 and caps 17. The differences between several embodiments of the connector 15 and of the cap 17 are explained hereinafter.

First Embodiment

With reference to FIGS. 2a to 2h, the connecting device 7 according to the first embodiment is configured to cooperate with a transverse pin 13 of the wiper arm.

The transverse pin comprises, for example, a shoulder 131 visible in FIG. 2d. As a result, the transverse pin 13 has a first section 133 of a first diameter and a second section 135 of a second diameter, for example less than the first diameter. The first section 133 is configured to be assembled with the connector 15 (not visible in FIG. 2d) and the second section 135 is configured to be assembled with the longitudinal end 11 of the windscreen wiper arm 5 (not visible in FIG. 2d).

The shoulder 131 thus serves as a bearing surface at the longitudinal end 11 of the windscreen wiper arm 5 in the assembled state of the transverse pin 13 and the longitudinal end 11 (see FIG. 2e).

With reference again to FIG. 2d, the transverse pin 13 may also have an end 137 of a diameter greater than the second section 135. The end 137 may be formed after the assembly of the transverse pin 13, more specifically the second section 135, with the windscreen wiper arm 5 (see also FIGS. 2a, 2b, 2e) for example by snap riveting, so as to fix the longitudinal end 11 and the transverse pin 13. The second section 135 is interposed between the first section 133 and the end 137 (see FIG. 2d).

Naturally, the shape of the transverse pin 13, in particular of the second section 135, is complementary to the shape of an orifice (not visible) formed on the longitudinal end 11 of the terminal segment 9 of the windscreen wiper arm 5 (see FIGS. 2a and 2b).

Connector

The connector 15 which is configured to be connected to the cap 17 but also to the windscreen wiper arm 5 and to the windscreen wiper 3, not visible in the FIGS. 2a to 2c, is described in more detail with reference to FIGS. 2a to 2c.

The connector 15 is, for example, directly connected to the windscreen wiper arm 5. Similarly, the connector 15 may be directly fixed to the windscreen wiper 3.

The connector 15 has, for example, a longitudinal shape in the main direction of extension.

According to the first embodiment illustrated in FIGS. 2a to 2c, the connector 15 may be symmetrical relative to a plane, the so called median plane, in the transverse T and vertical V directions and passing through the centre of the connector 15. The symmetrical connector 15 may be assembled in any direction on the windscreen wiper 3.

The connector 15 has a first part 151 or part for connecting to the windscreen wiper 3, configured to be connected to the windscreen wiper 3 (not visible in FIGS. 2a to 2c) and a second opposing part 153 or part for connecting to the windscreen wiper arm 5, configured to cooperate with the transverse pin 13 of the terminal segment 9 of the windscreen wiper arm 5.

The first part 151 of the connector 15 has, for example, the shape of an elongated clip in the longitudinal direction L and is designed to grip the windscreen wiper 3, not shown in FIGS. 2a to 2c. To achieve this, the first part 151 of the connector 15 has a support channel 155 for the windscreen wiper 3 (not visible in FIGS. 2a to 2c). The shape of the support channel 155 is, for example, adapted to the shape of the spoiler 31 of the windscreen wiper 3 (see FIG. 1).

In this example illustrated in FIGS. 2a, 2b, the second part 153 of the connector 15 comprises two lateral walls 157 or lateral flanges. The lateral walls 157 are arranged opposite one another and in this case extend in a plane parallel to the plane L, V.

The lateral walls 157 comprise means for assembly to the transverse pin 13. In the illustrated example, an orifice 159 for the passage of the transverse pin 13 is formed in each lateral wall 157. The orifices 159 form the means for assembly to the transverse pin 13.

More specifically, the orifices 159 are of a shape which is complementary to the shape of the transverse pin 13, in particular of the first section 133. The orifices 159 are of circular section according to the illustrated example.

The flanges or lateral walls 157 are received in the internal space delimited by the cap 17 in the assembled state of the connecting device 7 (see FIGS. 2a to 2c).

Cap

The cap 17 will be described in more detail with reference to FIGS. 2a to 2c and 2e to 2h.

The cap 17 is designed to be fixed to the connector 15 on the side opposing the wiper blade 33 of the windscreen wiper 3, also with reference to FIG. 1.

The cap 17 may be mounted on the terminal segment 9 of the windscreen wiper arm 5, the transverse pin 13 thereof being mounted in the connector 15.

The cap 17 has a longitudinal shape. The longitudinal direction L of the trihedron corresponds to the principal direction of the cap 17.

According to the first embodiment illustrated in FIGS. 2a to 2c and 2e, 2f, the cap 17 is configured to be assembled with the terminal segment 9 of the windscreen wiper arm 5 by translation in a direction perpendicular to the longitudinal direction of the cap 17 and also perpendicular to the transverse pin 13. In other words, the cap 17 is configured to be assembled with the terminal segment 9 of the windscreen wiper arm 5 by translation in the vertical direction V.

Moreover, the cap 17 has, for example, an open shape, i.e. which is not closed on all sides.

According to the first embodiment illustrated in FIGS. 2a to 2c and 2d to 2h, the cap 17 comprises an upper part 171 and an opposing lower part 173.

The upper part 171 is configured to cover the terminal segment 9 of the windscreen wiper arm 5 bearing the transverse pin 13 in the assembled state of the cap 17 on the windscreen wiper arm 5 (see FIGS. 2c and 2e).

The upper part is, for example, formed by an upper wall 171 of the cap 17 which may be of substantially rectangular shape, i.e. having a shape which is rectangular or equivalent or similar.

Moreover, according to this first illustrated embodiment, the cap 17 also comprises two opposing lateral walls 175 connected by the upper wall 171. In other words, the lateral walls 175 extend from the upper wall 171. In the assembled state of the cap 17 on the windscreen wiper arm 5, the lateral walls 175 extend in the direction of the terminal segment 9 of the windscreen wiper arm 5.

According to the first illustrated embodiment, the cap 17 further comprises an end wall 177 connected to the upper wall 171 and to the lateral walls 175. The end wall 177 in this case extends in a plane parallel to the plane V, T and the lateral walls 175 in this case extend in a plane parallel to the plane L, V.

"Lower part" 173 is also understood as a wall which is arranged opposite the upper part, in this case the upper wall 171, and which is lower than one or more lower edges of the cap 17, in particular of the lateral walls 175 and/or end walls 177 of the cap 17. As a variant or in addition, the lower part 173 may comprise a portion of the lateral walls 175 and/or end walls 177 of the cap 17 which are located on the side opposing the upper wall 171.

In the example illustrated, no wall is arranged opposite the upper wall 171. The lower part 173 is formed by the lower edges and the lower portions of the lateral walls 175 and possibly the end wall 177.

Moreover, the lower part 173 of the cap 17 comprises at least one support means 19 produced integrally with the cap 17.

An example of the support means 19 according to the first embodiment is shown in FIGS. 2b, 2e, 2f, 2g.

With reference to FIGS. 2e and 2f, the support means 19 are configured to cooperate with the terminal segment 9 of the windscreen wiper arm 5 for the assembly of the cap 17 with the terminal segment 9 of the windscreen wiper arm 5.

"Support means" is understood as any element or device or member participating in the support of the terminal segment 9 of the windscreen wiper arm 5 in the cap 17, in the assembled state. By way of example in a non-limiting and non-exhaustive manner, one or more reliefs, hooks, one or more protuberances, tongues, tabs, ribs or even any other deformation of the cap 17 may be cited.

According to the first illustrated embodiment, two support means 19 are provided on the lower part 173 of the cap 17. These support means 19 may comprise at least one clipping element or member.

Each support means 19 may comprise at least one relief 21. The or each relief 21 is formed on the lower part 173 of the cap 17, namely in this example formed on the lower portion of a lateral wall 175 of the cap 17. The or each relief 21 is made of the same material as the cap 17.

In particular, the cap 17 may comprise at least two separate reliefs 21. The two reliefs 21 are advantageously arranged on the same lateral wall 175. Naturally, a single relief 21 or conversely more than two reliefs 21 are conceivable.

Each relief 21 protrudes over the lateral wall 175, more specifically over the lower portion or the bottom of the lateral wall 175, by extending from the lateral wall 175 to the interior of the cap 17.

The or each relief 21 extends longitudinally in the longitudinal direction L of the cap 17.

In particular in this example, the clipping reliefs 21 are configured to block the retraction of the terminal segment 9 of the windscreen wiper arm 5 after assembly with the cap 17. These clipping reliefs 21 are also advantageously shaped so as to facilitate the assembly of the terminal segment 9 of the windscreen wiper arm 5 with the cap 17. In order to achieve this, each relief 21 comprises an oblique face 211 and a stop face 213.

The oblique face 211 is oblique or inclined relative to the lower part 173 of the cap 17. In this example, the oblique face 211 is inclined relative to the plane formed by the lateral wall 175 bearing the relief 21. In this case, it is a plane parallel to the plane L, T.

The oblique face 211 is configured to be in contact with the terminal segment 9 of the windscreen wiper arm 5 during the assembly of the terminal segment 9 with the cap 17. More specifically, the oblique face 211 is the first face of each relief 21 to be in contact with the longitudinal end 11 of the terminal segment 9 of the windscreen wiper arm 5. This oblique face 211 functions as the leading edge.

This oblique face 211 is configured so as to facilitate the introduction of the windscreen wiper arm 5, i.e. the vertical sliding or translation movement. To achieve this, for example, it is provided that the oblique face 211 forms an incline rising in the direction of introduction of the terminal segment 9 of the windscreen wiper arm 5 into the cap 17.

The stop face 213, most clearly visible in FIG. 2f, forms an edge, the terminal segment 9 of the windscreen wiper arm 5 being configured to bear thereagainst after assembly. The stop face 213 may be substantially planar. In other words, the stop face 213 is of planar or equivalent shape.

According to the particular embodiment illustrated in FIGS. 2f and 2g, each relief 21 is produced in the form of a polyhedron comprising the oblique face 211, the stop face 213 and also comprising a base and two opposing lateral faces 215.

The base of the relief 21 coincides with the internal face of the lateral wall 175 of the cap 17 bearing the relief 21. "Internal face" is understood as a lateral wall 175 of the cap 17, the face being arranged on the side of the connector 15 and being opposite a lateral face 157 of the connector 15 in the assembled state of the connecting device 7.

In the illustrated example, this base of the relief 21 defines a substantially rectangular shape extending longitudinally in the direction L. In other words, the base of the relief 21 may be of rectangular or similar shape.

The lateral faces 215 of the relief 21 are respectively of substantially triangular shape. In other words, the lateral faces 215 are of triangular or similar shape. These lateral faces 215 join the base, the stop face 213 and the oblique face 211.

Thus, during the assembly of the cap 17 with the windscreen wiper arm 5 and with the connector 15 receiving the transverse pin 13 of the windscreen wiper arm 5, the longitudinal end 11 slides on the oblique face 211 until it comes to bear against the edge formed by the stop face 213, at the end of the path of the introduction of the terminal segment 11 of the windscreen wiper arm 5 into the cap 17. Once the lower face of the longitudinal end 11 bears against the stop face 213, this contributes to the blocking of the windscreen wiper arm 5 in translation along the vertical axis V.

According to one variant, the clipping relief(s) 21 may have a function of guiding the terminal segment 9 of the windscreen wiper arm 5 during the assembly of the terminal segment 9 in the cap 17.

Moreover, it is possible to provide that the cap 17 also comprises a guide 137 for the end of the transverse pin 13 during the introduction of the terminal segment 9 of the windscreen wiper arm 5 into the cap 17. This guide is produced, for example, in the form of a recess 22 on the lateral wall 175 having the reliefs 21. This recess 22 is visible in the FIGS. 2b, 2e and 2g. The recess 22 is located between the two reliefs 21.

The recess 22 is of a shape suitable for the guidance of the end 137 along a vertical sliding movement and is thus complementary to the shape of the end 137. The recess 22 is, for example, substantially U-shaped as visible in FIG. 2b. In other words, the recess 22 has a U-shape or an equivalent shape approximating a U-shape.

The base of the U-shape is located in this example in the vicinity of the upper wall 171 of the cap 17 and the ends of the branches of the U-shape on either side of the base are located in the vicinity of the reliefs 21.

Moreover, as disclosed above, the cap 17 makes it possible, in particular, to lock the assembly. To this end, the cap 17 comprises at least one fixing means 23 (see FIGS. 2e, 2g, 2h) configured to cooperate with the transverse pin 13, so as to fix and hold the transverse pin 13 in position on the cap 17 in the assembled state of the cap 17 on the terminal segment 9.

The fixing means 23 may permit the fixing/support of the transverse pin by a cooperation of shape with the transverse pin 13.

According to the first embodiment illustrated in FIGS. 2e and 2h, the fixing means 23 comprises at least one orifice 25 which is formed on the cap 17 and configured to block the transverse pin 13 borne by the windscreen wiper arm 5 in the assembled state of the cap 17 on the terminal segment 9. According to the first embodiment, it is a blind orifice 25.

The orifice 25 is provided on the lateral wall 175 of the cap 17 opposing the lateral wall 175 bearing the one support means or both support means 19. This orifice 25 is thus arranged on the side opposing the two reliefs 21 disclosed above.

In a complementary manner, the fixing means 23 may also comprise an incline 26.

The incline 26 is formed on the internal face of the lateral wall 175 of the cap 17 having the orifice 25.

This incline 26 is arranged so as to start from the lower edge of the lateral wall 175 of the cap 17 having the orifice 25, so as to terminate by forming a portion of the contour of the orifice 25.

The incline 26 is inclined relative to the general plane defined by the lateral wall 175 of the cap 17 having the orifice 25. By way of non-limiting example, the incline 26 is inclined relative to the plane defined by this lateral wall 175 by an angle $\alpha$ in the order of 10° to 30°. In particular, in a non-limiting manner, the angle $\alpha$ may be in the order of 15°.

Moreover, in order to facilitate the insertion of the transverse pin 13 into the orifice 25 during assembly of the terminal segment 9 of the windscreen wiper arm 5 with the cap 17, the incline 26 rises from the lower edge of the lateral wall 175 as far as the orifice 25.

In the assembled state, it is thus the free end of the first section 133 of the transverse pin 13 which is blocked in the orifice 25. Once the free end of the first section 133 of the transverse pin 13 is engaged in the associated orifice 25, this makes it possible to limit the relative longitudinal and vertical displacement between the cap 17 and the terminal segment 9 of the windscreen wiper arm 5 and thus to prevent these components from being pulled off in the longitudinal or vertical direction.

The fixing means 23 may comprise, moreover, at least two protuberances 27 formed on the upper part 171 of the cap 17. More specifically, the protuberances 27 are formed on the internal face of the upper wall 171 forming the upper part. "Internal face" is understood as the face of the upper wall 171 designed to be arranged opposite the connector 15 in the assembled state of the connecting device 7.

These protuberances 27 extend toward the interior of the cap 17. The transverse pin 13 of the terminal segment 9 of the windscreen wiper arm 5 is configured to be engaged between the two protuberances 27 during the assembly with the cap 17, as most clearly visible in FIG. 2e. This permits the centring of the terminal segment 9 of the windscreen wiper arm 5 and also contributes to supporting the transverse pin 13 in position.

In particular, the protuberances 27 each have substantially a figure of eight-shape, simplified hereinafter by "8-shape" by using the numerical reference 8. In other words, the protuberances have an 8-shape or equivalent, i.e. approximating an 8-shape. Naturally this 8-shape is non-limiting and any other shape is conceivable.

The windscreen wiper arm 5 fixed to the connector 15 and to the cap 17 by the transverse pin 13 is thus supported from being pulled off in the vertical direction V by the cap 17 and, in particular, the reliefs 21 and the blind hole 25, and possibly the protuberances 27, by preventing it from escaping from the bottom with reference to the arrangement of the elements in the FIGS. 1, 2a, 2c and 2f.

Moreover, in order to permit the locking or unlocking of the cap 17 and of the terminal segment 9 of the windscreen wiper arm 5, the cap 17 comprises at least one flexible or resilient element. According to the embodiment disclosed, at least the lateral wall 175 of the cap 17 bearing the relief 21 is at least partially flexible and it thus configured to be deformed so as to permit the locking or the unlocking. Advantageously, the two opposing lateral walls 175 are at least partially flexible.

The cap 17 thus forms a gripping member which is configured to be deformed in a reversible manner by the action of an external force. For the assembly of the cap 17 with the windscreen wiper arm 5, a user is able to push the cap 17 in the vertical direction V such that the reliefs 21 and the longitudinal end 11 of the windscreen wiper arm 5 slide relative to one another. At least the lateral wall 175 bearing the reliefs 21 is deformed due to the incline of the oblique face 211 of each relief 21. To disengage the longitudinal end 11 of the edges 213 of the reliefs 21 formed on the cap 17, see FIG. 2*f*, it suffices to move the two lateral walls 175 of the cap 17 apart to unlock the assembly. No tool is required for the locking or for the unlocking.

Finally, the cap 17 may also comprise at least one abutment 29. In the example illustrated in FIGS. 2*b* and 2*g*, three abutments 29 are provided. These abutments 29 are arranged on the upper part 171 of the cap 17. In particular, in the example disclosed, the abutments 29 are arranged on the internal face of the upper wall 171 forming the upper part.

The abutments 29 may be produced integrally with the cap 17. These abutments 29 serve for the adjustment of the mounting of the terminal segment 9 of the windscreen wiper arm 5 in the cap 17, with reference more particularly to FIG. 2*b*.

Moreover, the height of these abutments 29, i.e. in the vertical direction V, may be adapted and easily reworked in the injection-moulding tool. This prevents reworking the entire face, in this case the internal face of the upper wall 171 of the cap 17.

The abutments 29 are arranged on the side of the cap 17 which is designed to receive the longitudinal end 11 of the windscreen wiper arm 5. In other words, the abutments 29 are arranged on the same side as the reliefs 21 but offset in the vertical direction V. The reliefs 21 are arranged at the bottom whilst the abutments 29 are arranged at the top.

Moreover, according to this first embodiment, the support means 19 and fixing means 23 are produced integrally with the cap 17, whilst being provided in the illustrated example in separate locations of the cap 17. Thus the production of the part is facilitated and this improves the mounting and the dismantling on the connector 15.

Second Embodiment

A second embodiment is illustrated in FIGS. 3*a* to 3*f*. Only the elements which are different from the first embodiment are disclosed hereinafter.

According to the second embodiment, the connecting device 7 (FIGS. 3*a* to 3*d*) is configured to cooperate with a windscreen wiper arm 5 which differs from the first embodiment by the transverse pin 13.

The transverse pin 13, most clearly visible in FIG. 3*e*, comprises a collar 132, for example formed by two successive shoulders.

In a manner similar to the first embodiment, the transverse pin 13 has a first section 133 which is configured to be assembled with the connector 15 (not visible in FIG. 3*e*) and a second section 135 which is configured to be assembled with the longitudinal end 11 of the windscreen wiper arm 5 (not visible in FIG. 3*e*).

Moreover, according to the illustrated example, the collar 132 is located between the first section 133 and the second section 135. The first and second sections 133 and 135 of the transverse pin 13 on either side of the collar 132 may be of the same diameter. According to the second embodiment, the collar 132 has a bearing surface on the longitudinal end 11 of the windscreen wiper arm 5 in the assembled state of the transverse pin 13 and the longitudinal end 11, as visible in FIGS. 3*b* to 3*d*.

In the example of FIG. 3*e*, the transverse pin 13 also comprises a base 136 at the free end of the first section 133.

The first section 133 is designed to be mounted in the connector 15, such that the collar 132 and the base 136 are arranged so as to bear or to be in abutment against the external faces of the lateral walls 157 of the connector 15 (see FIG. 3*d*). "External face" is understood as a lateral wall 157, the face being designed to be arranged opposite the internal face of a lateral wall 175 of the cap 17 in the assembled state of the connecting device 7.

In a similar manner to the first embodiment, the transverse pin 13 may further comprise an end 137 having a diameter greater than that of the second section 135, for example formed by snap riveting. The second section 135 is interposed between the collar 132 and the end 137.

Connector

According to this second embodiment, with reference to the connector 15, it is the second part 153 or part for connecting to the windscreen wiper arm 5 which differs from the first embodiment.

In particular, the means for assembly of the transverse pin 13 on the two lateral walls 157 are no longer produced in the form of an orifice 159, as in the first embodiment, but in the form of notches 159' (see FIGS. 3*b* to 3*d*). The notches 159' and, in particular, their shape and their dimensions are suitable for the first section 133 of the transverse pin 13 but do not permit the passage of the collar 132 and the base 136 inside the connector 15, i.e. between the internal faces of the two lateral walls 157.

Cap

With reference to the cap 17, most clearly visible in FIG. 3*f*, the orifice 25 is configured to receive the base 136 of the transverse pin 13 (not visible in FIG. 3*f*) in the assembled state of the cap 17 on the terminal segment 9 of the windscreen wiper arm 5.

According to the second embodiment, it is possible that the fixing means 23 no longer comprises protuberances 27 formed on the upper wall 171 of the cap 17 disclosed above with reference to FIGS. 2*e*, 2*g* of the first embodiment.

The remainder of the description with reference to the first embodiment illustrated in FIGS. 2*a* to 2*h* applies to the second embodiment.

Third Embodiment

A third embodiment is illustrated in FIGS. 4*a* to 4*h*. Only the elements which are different from the first embodiment are disclosed hereinafter.

In particular, according to this third embodiment, it is the cap 17 which differs.

The cap 17 is configured for assembly with the connector 15 by longitudinal translation, substantially parallel to the longitudinal direction L. "Substantially parallel translation" is understood as translation parallel to the longitudinal direction L or in a direction approximating a direction parallel to the longitudinal direction L.

To this end, the cap 17 may comprise one or more guide means of the connector 15 and/or the terminal segment 9.

Moreover, according to this third embodiment, the lower part 173 of the cap 17 comprises a support means 19 produced integrally with the cap 17 and comprising a relief 21' (see FIGS. 4d, 4f and 4h). The same relief 21' extends over more than half of the length of the cap 17. According to the illustrated example, the relief 21' extends over approximately the entire length of the cap 17.

Naturally, as a variant, a plurality of reliefs 21' are conceivable.

In a manner similar to the first embodiment, the relief 21' protrudes over the lower portion or bottom portion of the lateral wall 175 extending toward the interior of the cap 17.

In particular, this example is a guide relief 21', configured to guide the terminal segment 9 of the windscreen wiper arm 5 during the assembly of the terminal segment 9 of the windscreen wiper arm 5 with the cap 17. The relief 21' thus functions as a guide means of the terminal segment 9 of the windscreen wiper arm 5.

The relief 21' may have a shape which is similar to that of the reliefs 21 of the first embodiment.

Moreover, the cap 17 may comprise at least one partition 41 forming an abutment for the terminal segment 9 of the windscreen wiper arm 5. This partition 41, most clearly visible in FIG. 4g, is arranged at the end of the relief 21' opposite the end wall 177.

This partition 41 extends toward the interior of the cap 17, in particular along a plane parallel to the plane T, V substantially parallel to the end wall 177. In other words, the partition 41 extends parallel to the end wall 177 or approximately parallel to the end wall 177.

In particular, the partition 41 and the relief 21' may be formed without discontinuing the material.

In a similar manner to the first embodiment, the cap 17 comprises a guide for the end 137 of the transverse pin 13 during the introduction of the terminal segment 9 of the windscreen wiper arm 5 into the cap 17, for example produced in the form of a recess 22' (see FIGS. 4f and 4g) on the lateral wall 175 having the relief 21'.

The recess 22' is, for example, substantially U-shaped. In other words, the recess 22' has a U-shape or equivalent.

In contrast to the first embodiment, the U-shape is suitable for longitudinal translation and no longer suitable for vertical sliding. In this case, the branches of the U-shape extend longitudinally in the longitudinal direction L. In other words, the branches of the U-shape extend parallel or approximately parallel to the relief 21'. The base of the U-shape is oriented in the direction of the end wall 177 of the cap 17. The recess 22' is located above the relief 21'.

Moreover, with reference again to FIGS. 4a, 4c, 4d and 4f, the fixing means 23 comprises at least one orifice 25' formed on the cap 17.

Similar to the first embodiment, the orifice 25' is provided on the lateral wall 175 of the cap 17 opposing the lateral wall 175 bearing the relief 21'.

However, in contrast to the first embodiment, the orifice is a through-orifice 25' and no longer a blind orifice 25. As is most clearly visible in FIG. 4a or 4d, the transverse pin 13 is inserted into the orifice 25' during the assembly of the terminal segment 9 of the windscreen wiper arm 5 with the cap 17. In particular, it is the free end of the first section 133 of the transverse pin 13 which is received in the orifice 25'.

According to this third embodiment, it is also possible to provide an incline 26', permitting the transverse pin 13 to be guided as far as the orifice 25' visible in FIG. 4h.

However, in contrast to the first embodiment, the incline 26' is arranged so as to start from the lateral edge and no longer from the lower edge of the lateral wall 175 of the cap 17 having the orifice 25', so as to terminate by forming a portion of the contour of the orifice 25'.

Moreover, the lateral wall 175 having the incline 26' comprises at least one rib 43, defined by the edge of the cut-out to produce the incline 26'. This rib 43 advantageously provides a function of means for guiding the connector 15 for the assembly of the connecting device 7. A lateral wall 157 of the connector 15, in particular the top of this lateral wall 157, is able to slide on the rib 43.

Moreover, with reference to FIGS. 4c, 4f, 4h, the fixing means 23 may no longer comprise protuberances 27 formed on the upper part 171 of the cap 17, disclosed above with reference to FIGS. 2e, 2g of the first embodiment.

In contrast, according to the third illustrated embodiment, the fixing means 23 may comprise at least one fixing wall 28a. In the illustrated example, at least two fixing walls 28a are provided. These fixing walls 28a extend from the upper part 171 of the cap 17 to the interior of the cap 17, more specifically from the internal face of the upper wall 171 forming the upper part of the cap 17 according to the disclosed embodiments.

The fixing walls 28a extend substantially parallel to the lateral walls 175 of the cap 17. In other words, the fixing walls 28a extend parallel or approximately parallel to the lateral walls 175 of the cap 17. The fixing walls 28a extend in this example along a plane parallel to the plane L, V.

One of the fixing walls 28a is arranged opposite the lateral wall 175 of the cap 17, the orifice 25' being provided thereon. The other fixing wall 28a is arranged opposite the lateral wall 175 of the cap 17 having the recess 22'. The two fixing walls 28a are arranged opposite one another.

Moreover, the fixing walls 28a respectively comprise a notch 281. For the assembly of the cap 7 to the connector 5, this transverse pin 13 engages in the notches 281, said transverse pin 13 being mounted in said connector.

The two notches 281, the orifice 25' and the recess 22' are aligned in the transverse direction T.

Moreover, the notches 281 are of a shape which is complementary to the shape of the transverse pin 13, in particular of the first section 133. The notches 281 are substantially U-shaped, according to the illustrated example. In other words, the notches 281 are of U-shape or equivalent or similar shape, approximating a U-shape.

The fixing walls 28a function as hooking walls or hooks for fixing the transverse pin 13.

It is also possible to provide an additional wall 28b forming the join between the two fixing walls 28a. The joining wall 28b extends opposite the end wall 177. This joining wall 28b extends in this example parallel, or approximately parallel, to the end wall 177.

The assembly of the fixing walls 28a and joining walls 28b has in the illustrated example a substantially U-shaped section, i.e. U-shaped, or a shape approximating a U-shape, as most clearly visible in FIG. 4h.

Finally with reference again to FIG. 4f, the cap 17 may comprise a single abutment 29' rather than a plurality of separate abutments 29 on the upper part 171 of the cap 17, as disclosed in the first embodiment with reference to FIGS. 2b and 2g. This abutment 29' also permits the adjustment of the mounting of the terminal segment 9 of the windscreen wiper arm 5 in the cap 17.

For the assembly of the cap 17 with the windscreen wiper arm 5, a user may slide the cap 17 such that the longitudinal end 11 of the windscreen wiper arm 5 slides relative to the relief 21'. At least the lateral wall 175 having the orifice 25' is deformed due to the rising incline 26' which leads to the orifice 25'.

To disengage the end of the transverse pin 13 from the orifice 25', in a manner similar to the first embodiment, it suffices to move the two lateral walls 175 of the cap 17 apart to unlock the assembly. No tool is required for the locking or the unlocking.

The cap 17 and the support means 19 of the terminal segment 9 of the windscreen wiper arm 5 and advantageously the fixing means 23 of the transverse pin 13 borne by the cap 17 are produced integrally. Moreover, the support means 19 of the terminal segment 9 of the windscreen wiper arm 5 are separate from the fixing means 23 of the transverse pin 13.

Thus a cap 17 and the means required for the simple assembly of the connecting device 7 with the windscreen wiper arm 5 are produced integrally. According to the first and second embodiments, the locking may be carried out in a simple manner by clipping during assembly, without requiring additional complicated procedures.

Moreover, the support means 19 and/or the fixing means 23 are advantageously shaped so as to prevent the cap 17 and/or the connector 15 and/or the windscreen wiper arm 5 from being pulled off in the vertical direction V.

Moreover, the fixing means 23 are configured to block longitudinally the movement of the connector 15 relative to the cap 17, the transverse pin 13 being mounted in said connector.

Finally, the support means 19 and/or the fixing means 23 permit a reversible locking of the connecting device 7 on the windscreen wiper arm 5.

The invention claimed is:

1. An assembly comprising:
a terminal segment of a windscreen wiper arm connected to a windscreen wiper;
a cap assembled with the terminal segment, the cap comprising:
an upper part that covers the terminal segment of the windscreen wiper arm in an assembled state of the cap on said terminal segment, said terminal segment having a longitudinal end bearing a transverse pin defining a pivot axis of the windscreen wiper;
a lower part opposing the upper part; and
at least one fixing means that cooperates with the transverse pin to fix the transverse pin to the cap,
wherein the lower part of the cap comprises at least one support means produced integrally with the cap and which cooperates with the terminal segment of the windscreen wiper arm for the assembly of the cap with the terminal segment of the windscreen wiper arm.

2. The assembly according to claim 1, wherein said at least one support means comprises at least one relief formed on the lower part of the cap.

3. The assembly according to claim 2, further comprising two opposing lateral walls extending from the upper part of the cap, wherein at least one relief is formed on a lower portion of at least one lateral wall.

4. The assembly according to claim 2, having a longitudinal shape, wherein said at least one relief extends in the longitudinal direction of the cap.

5. The assembly according to claim 4, comprising the same relief extending over more than half of the length of the cap.

6. The assembly according to claim 2, further comprising at least two separate reliefs.

7. The assembly according to claim 2, wherein said at least one relief comprises:
a stop face forming an edge, the terminal segment of the windscreen wiper arm that bears thereagainst in the assembled state of said terminal segment on the cap.

8. The assembly according to claim 1, wherein said at least one support means comprises at least one clipping relief that blocks the retraction of the terminal segment of the windscreen wiper arm in the assembled state of the terminal segment on the cap.

9. The assembly according to claim 1, wherein said at least one support means comprises at least one guide relief that guides the terminal segment of the windscreen wiper arm during the assembly of the terminal segment of the windscreen wiper arm with the cap.

10. The assembly according to claim 1, wherein said at least one fixing means comprises at least one orifice formed on the cap.

11. The assembly according to claim 10, wherein the orifice is blind.

12. The assembly according to claim 10, wherein the orifice is a through-orifice.

13. The assembly according to claim 1, wherein said at least one fixing means comprises at least two protuberances formed on the upper part of the cap.

14. The assembly according to claim 1, wherein said at least one fixing means comprises at least one fixing wall, or even at least two walls, extending from the upper part of the cap to the interior of the cap and respectively having a notch, the transverse pin borne by the windscreen wiper arm being engaged therein.

15. A connecting device for a mounting of a windscreen wiper on the windscreen wiper arm, the connecting device comprising:
a connector which is connected between the windscreen wiper and the windscreen wiper arm; and
an assembly comprising:
a terminal segment of the windscreen wiper arm which is connected to the windscreen wiper;
a cap assembled with the terminal segment, the cap comprising:
an upper part that covers the terminal segment of the windscreen wiper arm in an assembled state of the cap on said terminal segment, said terminal segment having a longitudinal end bearing a transverse pin defining a pivot axis of the windscreen wiper;
a lower part opposing the upper part; and
at least one fixing means that cooperates with the transverse pin to fix the transverse pin to the cap,
wherein the lower part of the cap comprises at least one support means produced integrally with the cap and which cooperates with the terminal segment of the windscreen wiper arm for the assembly of the cap with the terminal segment of the windscreen wiper arm.

16. A windscreen wiping system for a motor vehicle comprising:
at least one windscreen wiper; and
a connecting device for a mounting of the windscreen wiper on the windscreen wiper arm, the connecting device comprising:
a connector which is connected between the windscreen wiper and the windscreen wiper arm; and
an assembly comprising:
a terminal segment of the windscreen wiper arm which is connected to the windscreen wiper;
a cap assembled with the terminal segment, the cap comprising:
an upper part that covers the terminal segment of the windscreen wiper arm in an assembled state of the cap on said terminal segment, said terminal segment having a longitudinal end bearing a transverse pin defining a pivot axis of the windscreen wiper;
a lower part opposing the upper part; and
at least one fixing means that cooperates with the transverse pin to fix the transverse pin to the cap,
wherein the lower part of the cap comprises at least one support means produced integrally with the cap and which cooperates with the terminal segment of the windscreen wiper arm for the assembly of the cap with the terminal segment of the windscreen wiper arm.

* * * * *